United States Patent [19]

Chorman

[11] Patent Number: 4,473,051

[45] Date of Patent: Sep. 25, 1984

[54] INTERNAL COMBUSTION ENGINE

[76] Inventor: Thomas E. Chorman, Six Bowser Rd., New Brunswick, N.J. 08901

[21] Appl. No.: 437,535

[22] Filed: Oct. 29, 1982

[51] Int. Cl.³ .......................... F02B 3/00; F02P 5/04; F02D 11/10
[52] U.S. Cl. .................................. 123/476; 123/39; 123/65 R; 123/68; 123/585; 123/146.5 A; 123/617; 123/418; 123/567; 123/414; 123/350; 123/472; 123/319
[58] Field of Search ................ 123/472, 476, 1 R, 68, 123/65 R, 39, 146.5 A, 585, 418, 414, 350, 617, 319

[56] References Cited

U.S. PATENT DOCUMENTS 2,918,913  12/1959  Guiot ................................ 123/476

Primary Examiner—Ronald B. Cox
Attorney, Agent, or Firm—Charles E. Baxley

[57] ABSTRACT

An illustrative embodiment of the invention provides a four cycle internal combustion engine that produces one power stroke for each full rotation of the crankshaft. Direct fuel and oxidizer injection into the cylinder permits engine speed and power to be controlled by varying the duration of the intake stroke. This duration is controlled, moreover, by moving the distributor housing in relation to piston top dead center position.

1 Claim, 3 Drawing Figures

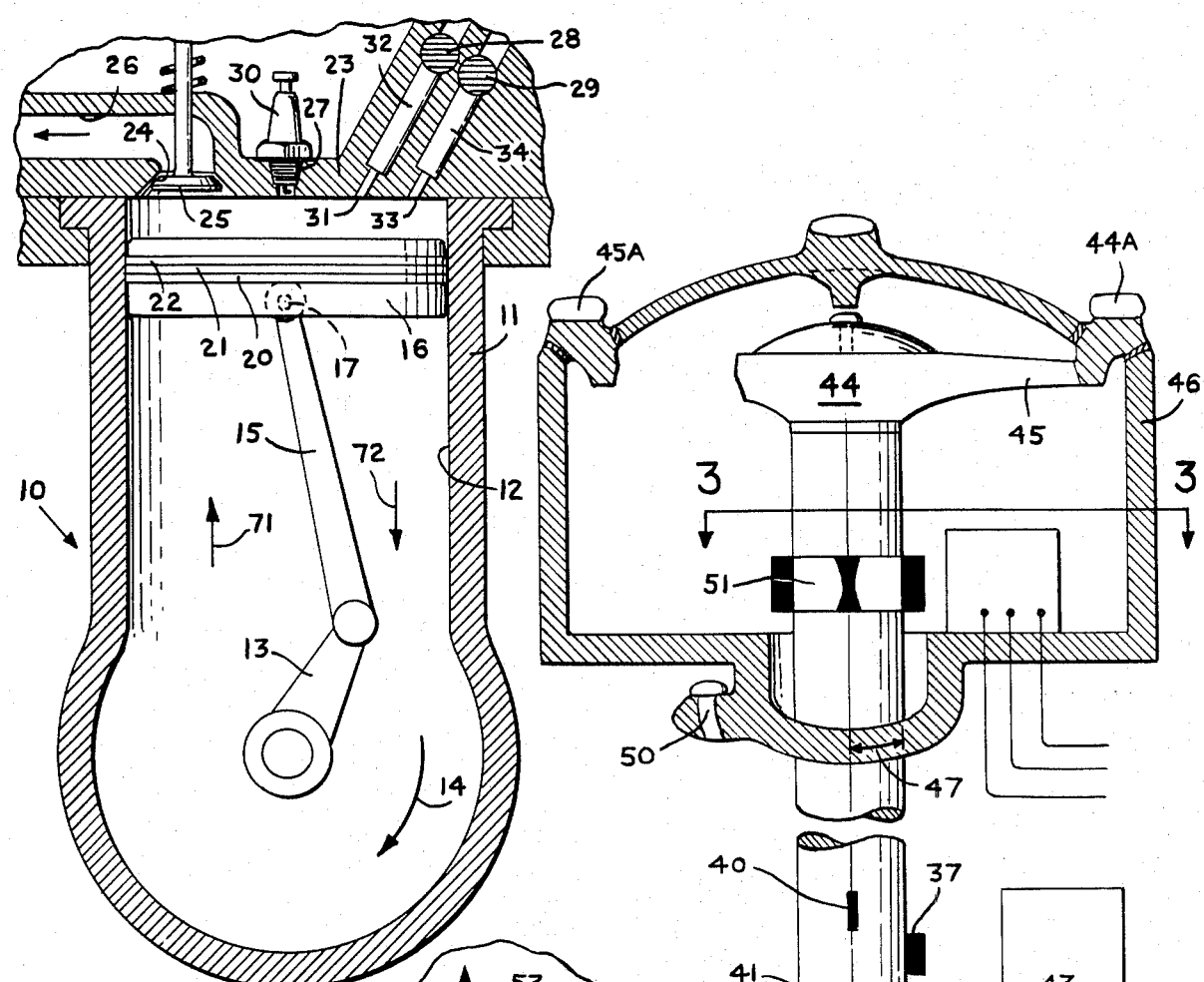

INTERNAL COMBUSTION ENGINE

This invention relates to internal combustion engine systems and, more particularly, to a two-stroke, four cycle internal combustion engine in which the fuel and oxidizer are directly injected under pressure into the cylinder, and the like.

There is a need for more efficient internal combustion engines. Clearly, in view of the need to conserve fuel, the desire to produce a more efficient reciprocating internal combustion engine has become almost a matter of national necessity.

Most reciprocating internal combustion engines are of the "four stroke" type. These four stroke engines produce one power stroke for each two 360° rotations of the engine shaft. Illustratively, the piston is driven in a longitudinal direction in the cylinder following ignition of the fuel-oxidizer charge to produce the power stroke. Momentum, as well as the action of other cylinders in the engine, drive the piston in the opposite longitudinal direction in the cylinder to expel exhaust from the cylinder and thereby to provide the exhaust stroke. Having expelled exhaust gases from the cylinder, the piston is next drawn in the opposite longitudinal direction to produce a low pressure within the cylinder that promotes the admission of a fresh fuel-oxidizer charge, that is, the intake stroke. The piston once more moves in the same direction as it did during the exhaust stroke in order to compress the fuel air mixture within the cylinder. As the piston reaches top dead center, the spark plug is energized in order to ignite the fuel air mixture which once more drives the piston within the cylinder in another power stroke.

Thus, ordinarily for each two rotations of the crankshaft there is but one power stroke. "Two stroke" engines, which produce one power stroke for each rotation of the crankshaft, have failed to become popular particularly for automotive application for a number of reasons. Further in this respect several of proposals for internal combustion engines have been advanced. The following patents are illustrative of some of these proposals.

U.S. Pat. No. 914,566 granted Mar. 9, 1909 to A. L. Galusha for "Internal Combustion Engine" discloses an internal combustion engine cylinder coupled to two reciprocating pumps for compressing air and gas before it is admitted to the cylinder for the normal compression stroke.

U.S. Pat. No. 1,901,709 granted Mar. 14, 1933 to R. Erren for "Method For Driving Internal Combustion Engines" shows an engine in which the power stroke occurs only during the last five to ten percent of the downward piston travel within the cylinder during the engine's cycle.

U.S. Pat. No. 2,269,106 granted Jan. 6, 1942 to A. R. Hoffman for "Internal Combustion Motor" shows a set of three cylinders arranged in a repeating sequence of cycles of compression, exhaust and power strokes.

U.S. Pat. No. 2,269,107, also granted to A. R. Hoffman on Jan. 16, 1942 for "Method Of Producing Power With Internal Combustion Motors" generally parallels the disclosure in U.S. Pat. No. 2,269,106, described above.

U.S. Pat. No. 2,499,642 granted Mar. 7, 1950 to J. A. Hannum for "Method Of Operating Internal Combustion Engines" shows the direct injection of liquid fuel and oxidizer into the cylinder of a reciprocating engine.

None of these proposals, however, seem to have been entirely satisfactory or achieved any appreciable degree of commercial acceptance.

These and other problems that have characterized prior art are overcome to a large extent through the practice of the invention.

Illustratively, the beneficial features of the four stroke internal combustion engine are combined in a manner that produces one power stroke for each full 360° rotation of the crankshaft. In this way the benefits of a four stroke reciprocating engine operation are made available in a manner that provides one power stroke for each full rotation of the crankshaft. This is in sharp contrast to the one power stroke for each two full rotations of the crankshaft that has heretofore characterized four stroke engine operation.

Illustratively, at about 0° or slightly after the piston reaches top dead center within the cylinder, fuel and oxidizer under high pressure are directly injected into the low pressure volume within the cylinder that is created by the longitudinal movement of the piston during the intake stroke. At about 10 to 15 degrees beyond top dead center, spark ignition initiates the power stroke to drive the piston to bottom dead center, or 180° of crankshaft rotation. At bottom dead center, an exhaust valve opens to enable the piston, which is moving longitudinally within the cylinder toward top dead center, to expel much of the burned gases from the cylinder. The exhaust valve closes at about 300° of crankshaft rotation. The piston, continuing to travel within the cylinder toward top dead center compresses the remaining combustion product gases within the cylinder. The piston continues to move to produce a pressure ratio of sightly more than 8 to 1 with the piston at 1° to 15° past top dead center. Between top dead center and 1° to 15° of crank shaft rotation fuel and oxidizer are directly injected under pressure into the cylinder to once more permit the cycle to repeat.

In accordance with an additional feature of the invention, engine speed and power are regulated by controlling the length of time (and hence, quantity) of fuel that is injected into the cylinder. Typically, this timing is achieved by moving the fuel and oxidizer injection cut-off sensors relative to the piston top dead center sensor in order to prolong or shorten the period of fuel an oxidizer injection.

Thus, it can be seen that the invention provides four stroke reciprocating engine operation in a manner that produces one power stroke for each 360° rotation of the crankshaft.

A more complete appreciation of the invention can be acquired through a study of the following detailed description of the invention, taken in conjunction with the drawing. The scope of the invention, however, is limited only by the claims.

FIG. 1 is a schematic front elevation in full section of an internal combustion engine embodying features of the invention;

FIG. 2 is a front elevation in full section of a schematic drawing of a distributor suitable for use with the engine shown in FIG. 1; and FIG. 3 is a plan view of a portion of the distributor shown in FIG. 1 taken along the section line 3—3 of FIG. 1 and viewed in the direction of the arrows.

For a more complete appreciation of the invention attention is invited to FIG. 1 which shows a cylinder and crank case assembly 10 that has a liquid cooling jacket 11. The cooling jacket 11 permits a coolant to circulate in thermal communication with a cylinder 12 in order to remove waste combustion heat from the engine. Within the cylinder 12 and crank case assembly 10 a crank shaft 13 is journalled at its extreme ends (not shown in the drawing) for rotation through 360° in a clockwise direction as viewed in FIG. 1 and as indicated by means of arrow 14.

One end of a connecting rod 15 is journaled to the crankshaft 13 for reciprocating motion. The other end of the connecting rod 15 is journalled within a cylindrical piston 16 by means of a wrist pin 17.

The outer surface of the piston 16 fits snugly within the confines of the cylinder 12. A suitably tight seal between the piston 16 and the cylinder 12 is provided by three annular piston rings 20, 21 and 22 which fit in annular grooves that are formed in the outer surface of the piston 16. The piston rings protrude radially a slight distance behond the outer surface of the piston 16 and bear against the wall of the cylinder 12. The cylinder 12 is closed on one end by means of a tansversely disposed cylinder head 23 which may be bolted or otherwise suitably secured to the cylinder. Within the cylinder head 23 a generally cone shaped exhaust port 24 is formed in order to provide a seat for an exhaust valve 25. The exhaust port 24 enables exhaust gases to flow from the cylinder volume that is formed between the piston 16 and the cylinder head 23 and an exhaust manifold 26. A threaded aperture 27 receives a spark plug 30. Although not shown in FIG. 1, the spark plug 30 is coupled electrically to the electrical spark distributor system which will be described subsequently in more complete detail.

The cylinder head 23 also accommodates a fuel injector nozzle 31. The nozzle 31 permits gasoline or other suitable fuel, which is under pressure in a fuel conduit 32, to discharge into the cylinder volume between the cylinder head 23 and the piston 16.

An oxidizer nozzle 33 permits high pressure oxygen, or some other suitable oxidizer that will sustain combustion within the cylinder, to discharge into the volume between the cylinder head 23 and the piston 16. Fuel and oxidizer flow through the nozzles 31 and 33, respectively, into the cylinder under the control of electrically activated valves 28, 29 respectively. These valves as described subsequently in more detail selectively interrupt the flow of fuel and oxidizer in the conduits 32 and 34 in response to signals from the distributor (not shown in FIG. 1).

In this connection, attention is invited to FIG. 2 which shows an illustrative distributor. As shown, a distributor shaft 35 rotates in the direction of arrow 36. Top dead center piston position indicators 37, 40, 41 and 42 are secured to the surface of the distributor shaft 35 at angularly spaced intervals. The illustrative position indicators 37, 40, 41 and 42 are magnets which each establish individual magnetic fields that register successively with a sensor 43 as the shaft 35 rotates. Although only one cylinder is shown in the drawing, each of the top dead center indicators 37, 40, 41 and 42 signal the sensor 43 when the particular piston with which it is associated in a multiple cylinder engine reaches top dead center within its respective cylinder.

Top dead center is a condition in which the piston 16 (FIG. 1) reaches its closest point of approach to the cylinder head 23 during the reciprocating movement of the piston 16 within the cylinder 12. For the purpose of this description,, with the piston 16 at top dead center, the angle of the crankshaft 13 is taken as 0° of rotation.

Further in this connection, although the piston position indicators 37, 40, 41 and 42 shown in FIG. 2 provide a magnetic signal, other signalling devices are equally suitable for use in connection with the invention. Thus, electrical contacts, or the like, also can be used in the practice of this invention.

The end of the distributor shaft 35 that is shown in FIG. 2 is equipped with a rotor 44 that has a transversely protruding arm 45. The arm 45 completes, in rotational sequence the electrical circuits for individual terminals 44A, 45A each of which is electrically coupled to the ignition coil and with the individual a respective one of the spark plugs with which the particular terminal is associated in a multiple cylinder engine, of which the spark plug 30 for the cylinder 12 in FIG. 1 is illustrative.

The terminals 44A and 45A are mounted on a distributor housing 46. The distributor housing 46, preferably made of an electrically insulating material, encloses the end of the distributor and the rotor 44. The distributor housing 46 also is rotatable through a limited distance relative to the distributor shaft 35 in either a clockwise or in a counterclockwise direction as indicated by means of arrow 47. This clockwise (or counterclockwise) rotation of the distributor housing 46 is controlled through a linkage that is connected to the engine throttle, of which only a link 50 is shown in FIG. 2.

Also secured to the distributor shaft 35 within the distributor housing 46 is an indicator mounting 51. The indicator mounting 51 produces signals that result in the shut off of fuel flow into the cylinder through the fuel injector 31 (FIG. 1), terminates oxidizer flow through the nozzle 33, activates spark ignition and provides a speed governor for the engine. These features of the invention are perhaps best shown in FIG. 3. As illustrated, the distributor shaft 35 is lodged in the center of a four pointed star shaped indicator mounting 51 in the four cylinder examples. Each of the four points of the star shaped indicator mounting 51 contain magnets 52, 53, 54, and 55. Each of these magnets are rotated by the distributor shaft 35 in the direction of arrow 56 in order to successively register, in order, with the injector closing sensor 57, spark ignition sensor 60 and speed governor sensor 61.

Electrical signals from the sensors 57, 60 and 61 that are initiated in response to the close approach of one of the magnets 52, 53 54 or 55 are coupled to the balance of the system through electrical conduits 62, 63 and 64.

The speed governor 65, as shown in this illustrative embodiment of the invention is an electro-magnetic system. When a desired maximum engine speed is achieved, the speed governor 65 advances an electrically permeable core 66 which engages a stop 67 in order to prevent the further movement of the distributor housing 46 in a counterclockwise direction as indicated by means of an arrow 70.

In operation, and best shown in FIG. 1, as the piston 16 moves toward the cylinder head 23 from bottom dead center toward top dead center in the direction of arrow 71 combustion products within the volume of the cylinder that is between the piston 16 and the head 23 are swept out of the cylinder through the exhaust port 24 which is opened through the timed movement of the exhaust valve 25. Expressed in terms of degrees of rotation of the crank shaft 13 in the direction of the arrow 14, the exhaust stroke continues from the 180° crank shaft position to about a 300° crank shaft position in order to sweep a good portion of the exhaust gases and combustion products out of the cylinder. In accordance with a salient feature of the invention, the exhaust valve 25 is timed to close as the crankshaft reaches a relative orientation of 300° thereby terminating the exhaust stroke.

The piston 16 continues to move in the direction of the arrow 71 within the cylinder 12 with the exhaust valve 25 closed, thereby compressing the now trapped exhaust gases within the cylinder. As the piston 16 reaches top dead center, in which the crank shaft reaches a 360° angular position, a compression ratio in the exhaust gas of slightly more than an illustrative 8:1 is attained.

At the time the piston 16 reaches top dead center, the piston position indicator that is shown in FIG. 2 and which is individual to the piston 16 (FIG. 1) is in registry with the piston position indicator sensor 43. This alignment between the indicator 37 and the sensor 43 produces a signal that opens the fuel valve 28 and the oxidizer valve 29 (FIG. 1) to permit the fuel and oxidizer injectors 31 and 33, respectively, to commence discharging a fuel-oxidizer charge into the cylinder 16. The piston 16, upon passing top dead center, reverses its motion and sweeps in the direction of arrow 72. As the piston 16 moves about 10° from top dead center in the direction of the arrow 72 and toward bottom dead center a magnet 55 (FIG. 3) which is specific to the piston 16 registers with the injector closing sensor 57 to produce a signal that is sent through the conduit 62. This signal ultimately causes the electrically activated fuel and oxidizer valves 28 and 29, respectively, to close in order to stop the further discharge of fuel and oxidizer into the cylinder and end the intake stroke.

As the rotation of the distributor shaft 35 moves the magnet 55 away from the injector closing sensor 57 and toward the spark ignition sensor 60, a signal is sent through the electrical conduit 63 to cause a spark discharge at the spark plug 30 (FIG. 1). Preferably, the spark discharge within the cylinder 12 occurs about 1° of crankshaft rotation past the end of the intake stroke in order to insure that the fuel and oxidizer valves 28 and 29, respectively are closed. This spark discharge ignites the fuel-oxidizer mixture within the cylinder thus initiating the power stroke. The power stroke drives the piston 16 further in the direction of the arrow 72 until the piston 16 reaches bottom dead center in which the angular orientation of the crank shaft 13 is once more 180°. In these circumstances the exhaust valve 25 opens once more to enable the piston 16 (which now is moving in the direction of the arrow 71) to sweep a good portion of the combustion products from the power stroke out of the cylinder 12.

Consequently, in accordance with an important feature of the invention, all four engine cycles compression, power, exhaust and intake occur during one complete 360° rotation of the crankshaft, in contrast with conventional four stroke, four cycle engines which produce only one power stroke for each 720° rotation of the crankshaft.

Engine speed and power, in accordance with another feature of the invention, are controlled through the regulation of the volume of the fuel and oxidizer charge that is admitted to the cylinder. This fuel and oxidizer regulation is provided by selectively varying the length of time that the intake portion of the stroke is permitted to continue. In this connection, attention is invited once more to FIG. 3 which shows limits to the angular rotation of the distributor housing 46 relative to the speed governor 65. Accordingly, as shown in FIG. 3, the injector closing sensor 60 is in registry with the magnet 55 when the piston 16 (FIG. 1) has moved 10° away from top dead center in the direction of the arrow 72.

To increase the length of time that the fuel and oxidizer charge is admitted to the cylinder 12, however, the distributor housing 46 (FIG. 3) is shifted in the direction of the arrow 70. This shift has the effect of increasing the length of time that is required for the magnet 55 to come into registry with the injector closing sensor 57. Preferably, the maximum relative angular travel of the distributor housing 46 would correspond to a variation in the duration of the intake stroke from a minimum of about 1° to a maximum of about 15° of crankshaft angular position relative to top dead center. Thus, a full range of engine speed and power is controlled by permitting the intake portion of the cycle to extend from top dead center to a range of about 1° to 15° beyond top dead center in the direction of the arrow 72 (FIG. 1).

About 1° or 2° of further crank shaft rotation after the intake stroke ends, the magnet 55 moves into registry with the spark ignition sensor 60. In these circumstances and as mentioned above, an appropriate signal is sent through the spark ignition sensor conduit 63 to initiate the power stroke.

As shown in FIG. 3, the four magnetic indicators 52, 53, 54 and 55 each are individual to a respective one of four cylinders in an engine, the number of cylinders being reflected in the number of magnetic indicators, each indicator being unique to a particular cylinder. Although electrical contacts or other suitable means could be used to provide the signals necessary to activate the sensors 57, 60, 61, the magnetic system shown in FIGS. 2 and 3 is preferred in the practice of the invention.

The speed governor sensor 61 registers the rate with which the magnet indicators 52, 53, 54 and 55 pass. In this manner, the speed governor sensor 61 measures the speed of the engine. Should the engine speed exceed a desired or predetermined value, the speed governor sensor 61 sends a signal through the conduit 64 that energizes the speed governor 65. The speed governor 65, moreover, is fixed in position relative to the top dead center sensor 43 (FIG. 2).

It will be recalled that when energized, the governor 65 causes the core 66 to protrude from the governor 65 and engage the stop 67 as previously noted, the stop 67 is fixed to and moves with the distributor housing 46. Consequently, in spite of an attempt to advance the distributor housing 46 in the direction of the arrow 70 through force applied to the throttle link 50 (FIG. 2), this advance is blocked by the contact between the immobile core 66 and the stop 67. Hence, engine speed and power is limited through the operation of the speed governor 65 and its associated sensor 61.

To reduce engine speed, the throttle link 50 (FIG. 2) is manipulated to move the distributor housing 46 (FIG. 3) in the direction of arrow 74. Movement in a clockwise direction, as viewed in FIG. 3, has the effect of closing the fuel and oxidizer supply at an earlier angular orientation of the crankshaft 13 (FIG. 1) relative to piston top dead center. This, of course, reduces the fuel and oxidizer charge that is supplied to the cylinder, thereby decreasing engine power and speed.

Turning once more to the exhaust and compression strokes, it has been found that closing the exhaust valve 25 (FIG. 1) when the crankshaft 13 has moved about 300° relative to piston top dead center and terminating the intake stroke at 10° to 15° beyond piston top dead center produces a compression ratio at the end of the intake stroke and the beginning of the power stroke of about 8 to 1 or slightly higher.

Thus, in accordance with the invention, the benefits of four stroke engine operation are provided in a manner that permits one power stroke for each full rotation of the crank shaft. Further in this regard, engine speed and power are controlled by regulating the duration of the intake stroke. In the preferred embodiment this is achieved by moving the distributor housing relative to the piston top dead center sensor.

I claim:

1. An internal combustion engine having a cylinder and a piston within the cylinder for reciprocating movement between top dead center and bottom dead center in order to drive crankshaft through a 360° rotation, comprising a fuel injector for charging the cylinder with fuel, an oxidizer injector for discharging an oxidizer into the cylinder, a spark plug for igniting the fuel and the oxidizer to produce combustion that establishes a power stroke for each full rotation of the crankshaft, an exhaust valve for enabling a portion of said combustion products to be discharged from the cylinder, a distributor, piston position sensing means fixed relative to said distributor for initiating the discharge of the fuel and the oxidizer into the cylinder when the piston is at top dead center and further fuel and oxidizer sensing means associated with said distributor to terminate said fuel and oxidizer discharge into the cylinder as the piston moves from top dead center to bottom dead center, said further fuel and oxidizer sensing means being movable relative to said piston sensing means in order to selectively vary the length of time that the fuel and oxidizer are injected into the cylinder, and ignition sensing means in said distributor for initiating spark ignition within the cylinder, said ignition sensing means being movable relative to said piston postion sensing means in order to initiate said power stroke after said fuel and oxidizer discharge into said cylinder has terminated a stop fixed in position relative to the distributor, speed governor sensing means associated with said distributor for registering the engine speed, and speed governor means fixed in position relative to said position sensing means for engaging said stop and arresting relative movement of said stop and said speed governor means.

* * * * *

UNITED STATES PATENT AND TRADEMARK OFFICE
CERTIFICATE OF CORRECTION

PATENT NO. : 4,473,051
DATED : September 25, 1984
INVENTOR(S) : Thomas E. Chorman It is certified that error appears in the above-identified patent and that said Letters Patent are hereby corrected as shown below:

Column 1, line 61 "16" should read --6--.

Column 2, line 46, the word "an" should read --and--;

Column 3, line 18, the word "behond" should read --beyond--;

Column 3, line 20, the word "tansversely" should read --transversely--;

Column 3, line 35, the word "high" should be inserted before --pressure--;

Column 8, line 14, the word "postion" should read --position--.

Signed and Sealed this

Second Day of April 1985

[SEAL]

Attest:

DONALD J. QUIGG

*Attesting Officer*   *Acting Commissioner of Patents and Trademarks*